(12) United States Patent
Kiyosawa

(10) Patent No.: US 11,738,458 B2
(45) Date of Patent: Aug. 29, 2023

(54) CONTROL METHOD FOR ROBOT SYSTEM

(71) Applicant: Seiko Epson Corporation, Tokyo (JP)

(72) Inventor: Yuki Kiyosawa, Shiojiri (JP)

(73) Assignee: SEIKO EPSON CORPORATION

(*) Notice: Subject to any disclaimer, the term of this patent is extended or adjusted under 35 U.S.C. 154(b) by 286 days.

(21) Appl. No.: 17/097,127

(22) Filed: Nov. 13, 2020

(65) Prior Publication Data

US 2021/0146542 A1 May 20, 2021

(30) Foreign Application Priority Data

Nov. 15, 2019 (JP) .................................. 2019-206825

(51) Int. Cl.
*B25J 9/16* (2006.01)
*B25J 13/08* (2006.01)
*B25J 5/00* (2006.01)

(52) U.S. Cl.
CPC ............. *B25J 9/1666* (2013.01); *B25J 5/007* (2013.01); *B25J 13/087* (2013.01)

(58) Field of Classification Search
CPC ........ B25J 9/1666; B25J 9/162; B25J 9/1602; B25J 5/007; B25J 13/087; B25J 13/089; B25J 13/00; B25J 9/1664; B25J 9/1697; B25J 9/1633; B25J 9/163; B25J 9/1676; B25J 9/1674; B25J 9/1679; B25J 9/16; B25J 9/1653; B25J 9/1638; B25J 9/1656; B25J 9/1661; B25J 9/042; B25J 13/085; B25J 13/088; B25J 13/02; B25J 17/00; B25J 19/02; B25J 19/06; B25J 15/0019; B25J 18/00; B25J 3/04; G05B 2219/39322; G05B 2219/39001; G05B 2219/45063; G05B 2219/425; G05B 2219/40371; G05B 2219/40519; G05B 2219/39298;
(Continued)

(56) References Cited

U.S. PATENT DOCUMENTS 9,926,138 B1 * 3/2018 Brazeau .................... B25J 5/007
10,035,266 B1 * 7/2018 Kroeger .................. B25J 9/1664
(Continued)

FOREIGN PATENT DOCUMENTS

JP S61-274885 A 12/1986
JP 4974242 B2 * 7/2012
(Continued)

*Primary Examiner* — Khoi H Tran
*Assistant Examiner* — Nhi Q Bui
(74) *Attorney, Agent, or Firm* — Harness, Dickey & Pierce, P.L.C.

(57) ABSTRACT

A robot system includes a robot arm, a vehicle being movable and supporting the robot arm, and a tilt sensor configured to detect a tilt relative to a reference direction of at least one of the robot arm and the vehicle. The control method includes controlling the robot arm to sequentially position a control point of the robot arm to a plurality of target points. The controlling of the robot arm includes, when the control point is located at the target point where the control point is to be located one point previously to an object target point of the plurality of target points, resetting a control parameter for positioning the control point at the object target point based on the tilt from the reference direction, and positioning the control point at the object target point using the reset control parameter.

7 Claims, 12 Drawing Sheets

(58) Field of Classification Search
CPC ........... G05B 2219/50391; G05B 2219/39018;
G05B 2219/40331; G05B 2219/36035;
G05B 19/4155; G05B 19/416; G05B 19/425
See application file for complete search history.

(56) References Cited

U.S. PATENT DOCUMENTS

| | | | |
|---|---|---|---|
| 2005/0149231 A1* | 7/2005 | Pretlove | B25J 9/1671 700/264 |
| 2006/0155436 A1* | 7/2006 | Matsunaga | G05D 1/0274 701/25 |
| 2009/0016859 A1 | 1/2009 | Asakawa | |
| 2013/0307459 A1* | 11/2013 | Tian | G05B 19/25 318/570 |
| 2017/0015004 A1* | 1/2017 | Osaka | B25J 9/1641 |
| 2020/0023516 A1* | 1/2020 | Kato | B25J 9/1664 |

FOREIGN PATENT DOCUMENTS

| | | | |
|---|---|---|---|
| JP | 2017-074631 A | 4/2017 | |
| WO | 2006/046580 A1 | 5/2006 | |
| WO | WO-2013107124 A1 * | 7/2013 | ............ B66C 13/40 |

* cited by examiner

CONTROL METHOD FOR ROBOT SYSTEM

The present application is based on, and claims priority from JP Application Serial Number 2019-206825, filed Nov. 15, 2019, the disclosure of which is hereby incorporated by reference herein in its entirety.

BACKGROUND

1. Technical Field

The present disclosure relates to a control method for a robot system.

2. Related Art

In related art, for example, as shown in JP-A-2017-74631, there is a technique of moving an unmanned carrier with a robot arm placed thereon from one working place to another. In the technique, the robot arm picks up parts from trays placed in the respective working spaces and assembles the parts, and thereby, manufacturing work is performed. Differences in stop position of the unmanned carrier for the respective working spaces are corrected by image recognition of calibration plates placed in the respective working spaces.

However, in the technique of JP-A-2017-74631, differences in posture of the unmanned carrier with the robot arm placed thereon are not considered. Accordingly, positions and directions in a coordinate system of the robot arm placed on the unmanned carrier may differ from positions and directions of the coordinate system of the robot arm assumed at work in the respective working spaces. As a result, even when the robot arm is properly controlled, the position of the control point of the robot arm may differ from a position that the control point is to really reach.

SUMMARY

According to an aspect of the present disclosure, a control method for a robot system is provided. The robot system includes a robot arm, a vehicle being movable and supporting the robot arm, and a tilt sensor configured to detect a tilt relative to a reference direction of at least one of the robot arm and the vehicle. The control method includes controlling the robot arm to sequentially position a control point of the robot arm to a plurality of target points. The controlling of the robot arm includes, when the control point is located at the target point where the control point is to be located one point previously to an object target point of the plurality of target points, resetting a control parameter for positioning the control point at the object target point based on the tilt from the reference direction, and positioning the control point at the object target point using the reset control parameter.

DESCRIPTION OF EXEMPLARY EMBODIMENTS

A. First Embodiment

A1. Configuration of Robot System

Figure 1:
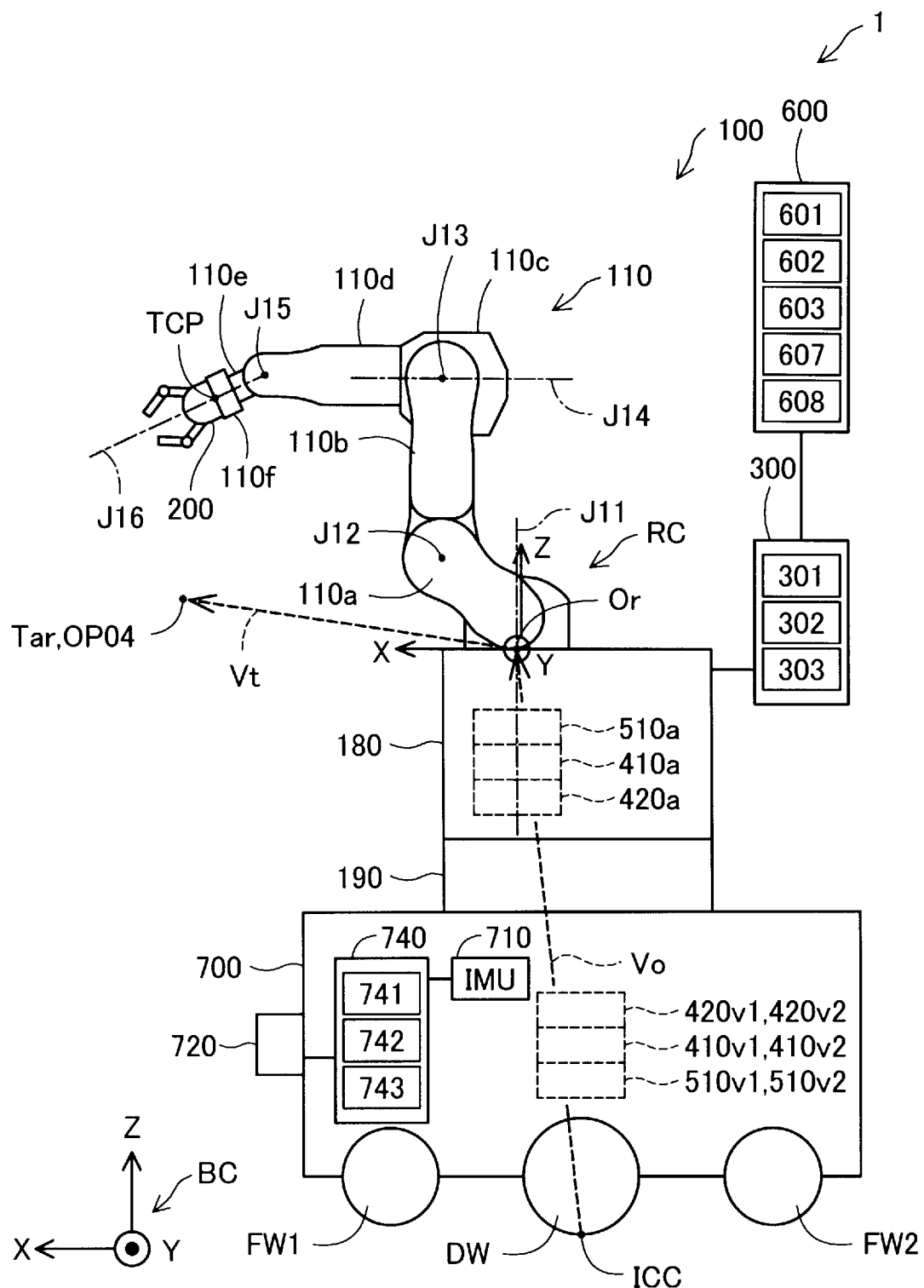
FIG. 1 is an explanatory diagram schematically showing an autonomous mobile robot of a first embodiment.

FIG. 1 is the explanatory diagram schematically showing the autonomous mobile robot 1 of the first embodiment. The autonomous mobile robot 1 receives an instruction by an higher-level management apparatus 600 and autonomously moves. The autonomous mobile robot 1 includes a robot 100, an end effector 200, an operation control apparatus 300, and a carriage 700.

In FIG. 1, to facilitate understanding of the technique, a base coordinate system BC and a robot coordinate system RC are shown. The base coordinate system BC is a three-dimensional orthogonal coordinate system defined by an X-axis and a Y-axis orthogonal to each other on a horizontal plane HL and a Z-axis in a vertical upward direction as a positive direction. The base coordinate system BC is defined for each of workstations WS. The workstations WS are locations where the autonomous mobile robot 1 performs work. The workstations WS will be described later.

The robot coordinate system RC is a coordinate system fixed with respect to the autonomous mobile robot 1. The upward direction of the autonomous mobile robot 1 is the Z-axis positive direction. The anterior side of the autonomous mobile robot 1 is the X-axis positive direction. The direction perpendicular to the Z-axis and the X-axis is the Y-axis positive direction. An origin Or of the robot coordinate system RC is a point located on a rotation axis of a joint J11 within a base 180. The base 180 and the joint J11 will be described later. Both the base coordinate system BC and the robot coordinate system RC are right-handed systems. Note that, in the base coordinate system BC and the robot coordinate system RC, the X-axis directions are also referred to as "anterior and posterior directions", the Y-axis directions are also referred to as "leftward and rightward directions", and the Z-axis directions are also referred to as "upward and downward directions".

The robot 100 is a vertical articulated robot. The robot 100 includes a robot arm 110, the base 180, and a force detection unit 190.

The robot arm 110 is supported by the base 180. The robot arm 110 may move the end effector 200 attached to the distal end portion of the robot arm 110. The robot arm 110 includes arm elements 110a to 110f and joints J11 to J16. That is, the robot 100 is a six-axis robot having the robot arm 110 with the six joints J11 to J16.

The joint J12, the joint J13, and the joint J15 are bending joints. The joint J11, the joint J14, and the joint J16 are twisting joints. The base 180 and the arm element 110a are coupled via the joint J11. The arm element 110a and the arm element 110b are coupled via the joint J12. The arm element 110b and the arm element 110c are coupled via the joint J13. The arm element 110c and the arm element 110d are coupled via the joint J14. The arm element 110d and the arm element 110e are coupled via the joint J15. The arm element 110e and the arm element 110f are coupled via the joint J16. The end effector 200 is coupled to the arm element 110f at the opposite side to the arm element 110e.

The respective joints J11 to J16 include servomotors 410, encoders 420, and reducers 510. The servomotors 410 are controlled by the operation control apparatus 300 and rotate the output shafts thereof. The reducers 510 reduce and transmit the rotations of the output shafts of the servomotors 410 to the arm elements. The encoders 420 detect the rotation angles of the output shafts of the servo motors 410.

In FIG. 1, the servo motor 410a that drives the joint J11, the encoder 420a, and the reducer 510a are shown with signs. To facilitate understanding of the technique, the servo motors 410 that drive the joints J12 to J16, the encoders 420, and the reducers 510 are not shown. In this specification, when the servo motors of the respective joints are referred to without distinction from one another, the servo motor 410 is used. When the encoders of the respective joints are referred to without distinction from one another, the encoder 420 is used. When the reducers of the respective joints are referred to without distinction from one another, the reducer 510 is used.

The force detection unit 190 is provided in the lower part of the base 180. The force detection unit 190 may detect a force applied to the robot arm 110. More specifically, the force detection unit 190 may detect forces in the directions of the three axes of the X-axis, the Y-axis, and the Z-axis applied from outside, i.e., another configuration than the force detection unit 190 and torque about a U-axis, a V-axis, and a W-axis as rotation axes. As a result, the force detection unit 190 may measure the forces in the directions of the three axes of the X-axis, the Y-axis, and the Z-axis and torque about the U-axis, the V-axis, and the W-axis acting on the robot arm 110 as the other configuration than the force detection unit 190. The output of the force detection unit 190 is transmitted to the operation control apparatus 300 and used for control of the robot 100. The operation control apparatus 300 may execute force control based on the output of the force detection unit 190.

The robot 100 may place the end effector 200 attached to the distal end portion of the robot arm 110 at a target point as a designated position in the three-dimensional space in a designated posture by respectively rotating the six joints J11 to J16 of the robot arm 110 using the servo motors. Note that a point representing the position of the end effector 200 in the three-dimensional space is also referred to as "TCP (Tool Center Point)".

The end effector 200 is attached to the distal end of the robot arm 110. The end effector 200 may grip a workpiece as a working object and releases the gripped workpiece under control by the operation control apparatus 300. As a result, for example, the end effector 200 and the robot 100 may grip and move the workpiece under control by the operation control apparatus 300.

The operation control apparatus 300 is a control apparatus that controls the operation of the robot 100 and the end effector 200. The operation control apparatus 300 is coupled to the robot 100. The operation control apparatus 300 is fixed to the carriage 700 with the robot 100.

The operation control apparatus 300 includes a CPU (Central Processing Unit) 301 as a processor, a RAM (Random Access Memory) 302, and a ROM (Read-Only Memory) 303. In the operation control apparatus 300, a control program for control of the robot 100 is installed. In the operation control apparatus 300, the CPU 301, the RAM 302, and the ROM 303 as hardware resources and the control program cooperatively operate. Specifically, the CPU 301 loads and executes computer programs stored in the ROM 303 in the RAM 302, and thereby, various functions are realized.

The carriage 700 supports the robot arm 110 via the force detection unit 190 and the base 180. The carriage 700 may move the robot 100 to an arbitrary position on the floor surface. The carriage 700 includes a pair of drive wheels DW, two pairs of driven wheels FW1, FW2, servomotors 410v1, 410v2, encoders 420v1, 420v2, reducers 510v1, 510v2, an inertial measurement unit (IMU) 710, a camera 720, and a carriage control unit 740.

The servo motors 410v1, 410v2 rotate the output shafts thereof under control by the operation control apparatus 300. The reducers 510v1, 510v2 reduce and transmit the rotations of the respective output shafts of the servo motors 410v1, 410v2 to the two drive wheels DW, DW. The two drive wheels DW, DW drive by transmission of the rotations from the reducers 510v1, 510v2. The encoders 420v1, 420v2 detect the rotation angles of the output shafts of the servomotors 410v1, 410v2, respectively. Note that the two drive wheels DW, DW may independently rotate by the servo motors 410v1, 410v2, respectively. As a result, the carriage 700 may move in an arbitrary direction.

In this specification, when the servo motors 410v1, 410v2 are referred to without distinction from one another, the servo motor 410v is used. When the encoders 420v1, 420v2 are referred to without distinction from one another, the encoder 420v is used. When the reducers 510v1, 510v2 are referred to without distinction from one another, the reducer 510v is used.

The two pairs of driven wheels FW1, FW2 support the carriage 700 with the pair of drive wheels DW. The driven wheels FW1, FW2 rotate by application of external forces. The driven wheels FW1, FW2 are not driven by an engine. The rotation shafts of the one pair of driven wheels FW1, the rotation shafts of the one pair of driven wheels FW2, and the rotation shafts of the one pair of drive wheels DW are parallel to one another. The diameters of the driven wheels FW1, FW2 are smaller than the diameters of the drive wheels DW.

In the carriage 700, the pair of drive wheels DW are constantly in contact with the floor surface. The pair of drive wheels DW rotate, and thereby, the carriage 700 moves. In the carriage 700, at least one pair of the two pairs of driven wheels FW1, FW2 are in contact with the floor surface with the pair of drive wheels DW. The driven wheels FW1, FW2 in contact with the floor surface with the pair of drive wheels DW support the carriage 700 with the pair of drive wheels DW. The carriage 700 tilts around a point ICC where the pair of drive wheels DW are in contact with the floor surface. When the carriage 700 tilts around the point ICC, one pair of the driven wheels FW1, FW2 may float from the floor surface without contact with the floor surface. In this case, the carriage 700 is supported by the four wheels of the one pair of the driven wheels FW1, FW2 in contact with the floor surface with the pair of drive wheels DW. Note that, even when the carriage 700 tilts around the point ICC, the carriage 700 tilts, but may be supported by the six wheels of the pair of drive wheels DW and the two pairs of driven wheels FW1, FW2 by a function of suspensions (not shown) of the carriage 700.

The IMU 710 may acquire information of accelerations in the X-axis directions, the Y-axis directions, and the Z-axis directions and angular velocities in the U-axis directions, the V-axis directions, and the W-axis directions of the carriage 700. The carriage control unit 740 recognizes the tilt of the carriage 700, the movement velocity including the velocity and the direction of the carriage 700, and the current position of the carriage 700 based on the information.

The camera 720 may acquire an image in a predetermined angle range in front of the carriage 700, i.e., in the X-axis direction of the robot coordinate system. The carriage control unit 740 recognizes the movement velocity including the velocity and the direction of the carriage 700 and the current position of the carriage 700 based on the image data generated by the camera 720.

The carriage control unit 740 is a control apparatus that controls the operation of the carriage 700. The carriage control unit 740 includes a CPU 741 as a processor, a RAM 742, and a ROM 743. In the carriage control unit 740, a control program for control of the carriage 700 is installed. In the carriage control unit 740, the CPU 741, the RAM 742, and the ROM 743 as hardware resources and the control program cooperatively operate. Specifically, the CPU 741 loads and executes computer programs stored in the ROM 743 in the RAM 742, and thereby, various functions are realized.

The carriage control unit 740 recognizes the tilt of the carriage 700 relative to the reference direction based on the information obtained from the IMU 710. Specifically, the carriage control unit 740 determines the tilt of the carriage 700 based on the direction of the gravity acceleration detected in the robot coordinate system RC by the IMU 710 when the autonomous mobile robot 1 is in the stationary condition. That is, the IMU 710 functions as a tilt sensor. Note that, in the embodiment, the tilt sensor is not limited to the IMU 710, but may be any sensor that may detect the rotation around the point ICC as long as the sensor may detect at least the rotation about the Y-axis. In the embodiment, the reference direction of the carriage 700 is a direction in which the directions of the X-axis, the Y-axis, and the Z-axis of the robot coordinate system RC are parallel to the directions of the X-axis, the Y-axis, and the Z-axis of the base coordinate system BC, respectively.

The higher-level management apparatus 600 provides instructions to a plurality of the autonomous mobile robots and controls those autonomous mobile robots 1. The higher-level management apparatus 600 is coupled to the operation control apparatus 300 of the robot 100 and the carriage control unit 740 of the carriage 700. The carriage 700 and the carriage control unit 740 may be connected via wired connection or wireless connection. Note that, in FIG. 1, to facilitate understanding of the technique, only one autonomous mobile robot 1 is shown.

The higher-level management apparatus 600 includes a CPU 601 as a processor, a RAM 602, a ROM 603, an input device 607, and an output device 608. In the higher-level management apparatus 600, a control program for control of the plurality of autonomous mobile robots 1 is installed. In the higher-level management apparatus 600, the CPU 601, the RAM 602, and the ROM 603 as hardware resources and the control program cooperatively operate. Specifically, the CPU 601 loads and executes computer programs stored in the ROM 603 in the RAM 602, and thereby, various functions are realized.

The input device 607 receives instructions from a user. The input device 607 is e.g. a mouse, keyboard, touch panel, or the like. The output device 608 outputs various kinds of information to the user. The output device 608 is e.g. a display, speaker, or the like.

A2. Operation of Robot System

Figure 2:
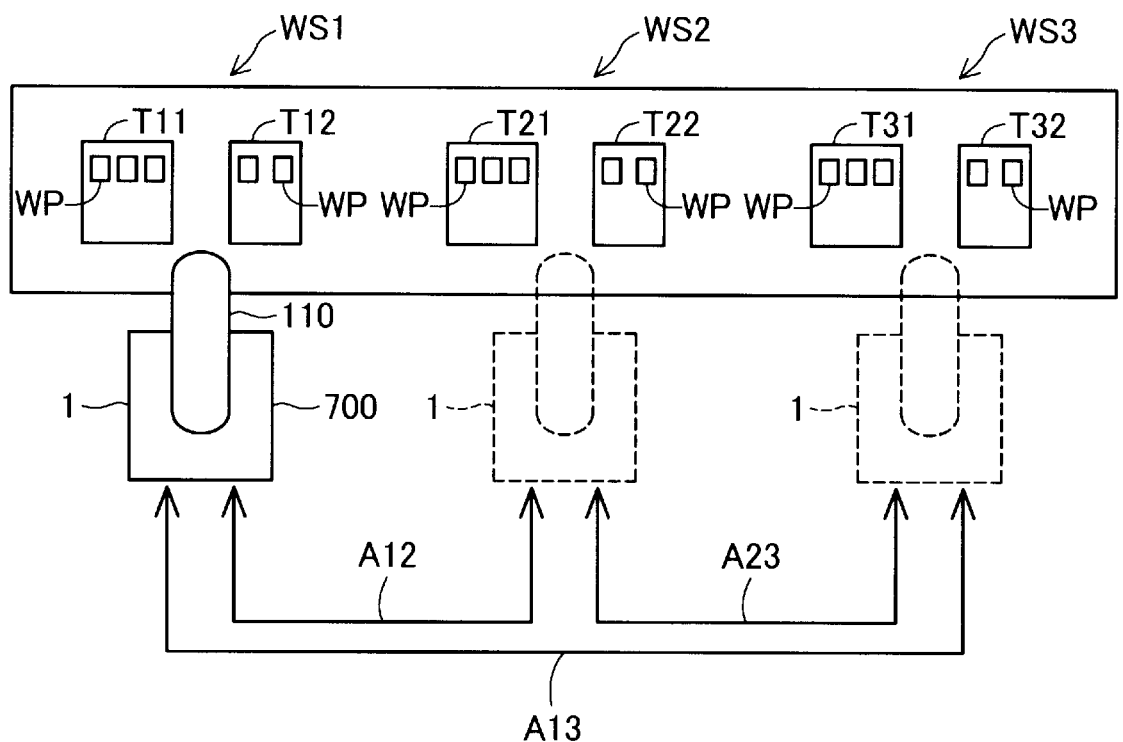
FIG. 2 is an explanatory diagram showing placement of workstations and movement of the autonomous mobile robot.

FIG. 2 is the explanatory diagram showing the placement of the workstations WS1 to WS3 and the movement of the autonomous mobile robot 1. The workstations WS1 to WS3 are locations where the autonomous mobile robot 1 performs work. The workstations WS1 to WS3 are placed in different positions from one another. The autonomous mobile robot 1 moves among the workstations WS1 to WS3 and performs work in the respective workstations WS1 to WS3. In FIG. 2, the movement of the autonomous mobile robot 1 among the workstations WS1 to WS3 is shown by arrows A12, A23, and A13.

Information of routes of the movement among the respective workstations WS1 to WS3 is stored in the RAM 742 of the carriage control unit 740 in advance. The CPU 741 controls the servo motors 410v1, 410v2 based on the information of the routes stored in the RAM 742 and the information obtained from the IMU 710 and the camera 720, and moves the carriage 700 toward the workstation WS in which the next work is to be performed.

The workstation WS1 includes trays T11, T12. In the tray T11, one or more workpieces WP are placed. The autonomous mobile robot 1 performs work of moving the workpiece WP from the tray T11 to the tray T12 in the workstation WS1.

The workstations WS2, WS3 have the same configuration as that of the workstation WS1. That is, the workstation WS2 includes trays T21, T22. The autonomous mobile robot 1 performs work of moving the workpiece WP from the tray T21 to the tray T22 in the workstation WS2. The workstation WS3 includes trays T31, T32. The autonomous mobile robot 1 performs work of moving the workpiece WP from the tray T31 to the tray T32 in the workstation WS3. In this specification, when the workstations WS1 to WS3 are referred to without distinction from one another, the workstation WS is used.

Figure 3:
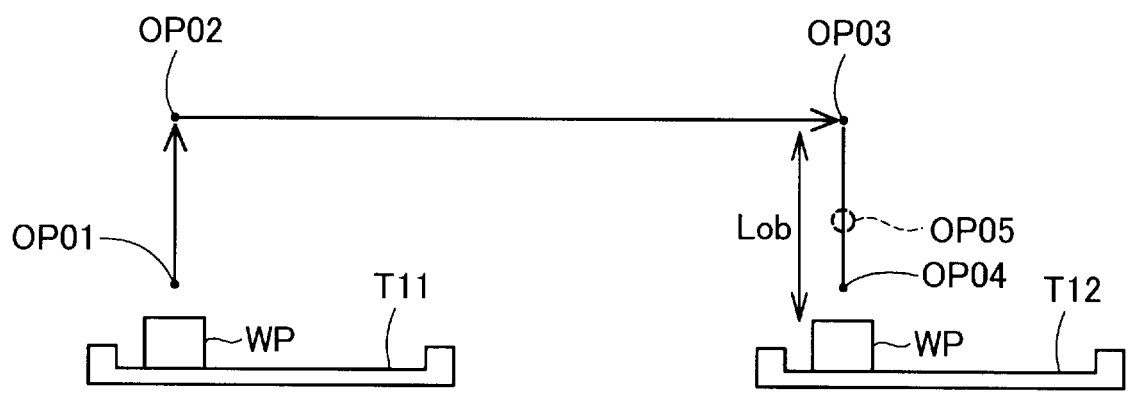
FIG. 3 is an explanatory diagram showing details of work in the workstation.

FIG. 3 is the explanatory diagram showing details of work in the workstation WS1. In the workstation WS1, the operation control apparatus 300 of the robot 100 controls the robot arm 110 so that the control point TCP of the robot arm 110 may be sequentially located at a plurality of target points OP01 to OP04.

In the example of FIG. 3, first, the control point TCP is placed at the target point OP01. When the control point TCP is at the target point OP01, the end effector 200 grips the workpiece WP on the tray T11. Then, the control point TCP is moved upward in the vertical direction toward the target point OP02 and is placed at the target point OP02. Then, the control point TCP is moved in the horizontal direction toward the target point OP03 and is placed at the target point OP03. Then, the control point TCP is moved downward in the vertical direction toward the target point OP04 and is placed at the target point OP04. When the control point TCP is at the target point OP04, the end effector 200 releases the workpiece WP and puts the workpiece WP on the tray T12.

In the workstations WS2, WS3, the operation control apparatus 300 of the robot 100 controls the robot arm 110 in the same manner.

Figure 4:
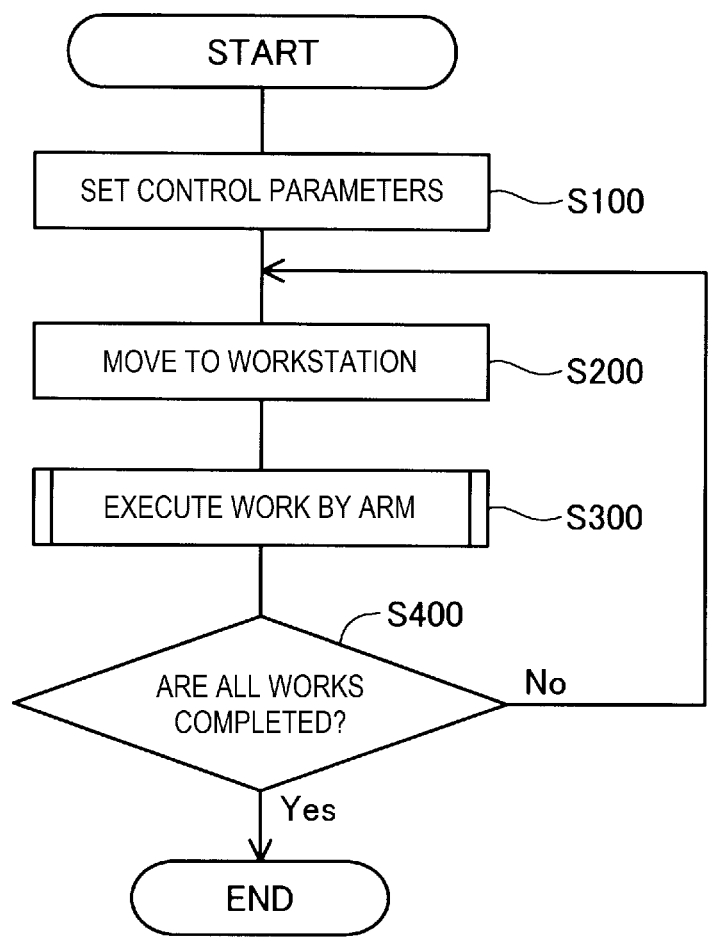
FIG. 4 is a flowchart showing processing when the autonomous mobile robot is operated.

FIG. 4 is the flowchart showing the processing when the autonomous mobile robot 1 is operated. At step S100, various control parameters when the autonomous mobile robot 1 is operated are determined. The control parameters include angles of the joints J11 to J16 of the robot arm 110 when the control point TCP is placed at the respective target points in the respective workstations WS1 to WS3. At step S100, on the assumption that the carriage 700 is placed in the reference direction in the respective workstations WS, the control parameters used in the work in the respective workstations WS are determined.

At step S200, the autonomous mobile robot 1 moves to the workstation WS in which the next work is to be performed. The processing at step S200 is mainly executed under control by the carriage control unit 740 of the carriage 700. The processing of settings prior to the operation of the autonomous mobile robot 1 is performed at step S100, and the control method for the autonomous mobile robot 1 as the robot system is substantially performed at steps S200 to S400.

At step S300, the autonomous mobile robot 1 executes work in the reached workstation WS by controlling the robot arm 110. The processing at step S300 is mainly executed under control by the operation control apparatus 300 of the robot 100.

At step S400, whether or not all of the works to be executed in the workstations WS1 to WS3 are completed is determined. When not all of the works to be executed in the workstations WS1 to WS3 are completed, the processing returns to step S200. When all of the works to be executed in the workstations WS1 to WS3 are completed, the processing is ended. The processing at step S400 is mainly executed under control by the higher-level management apparatus 600.

Figure 5:
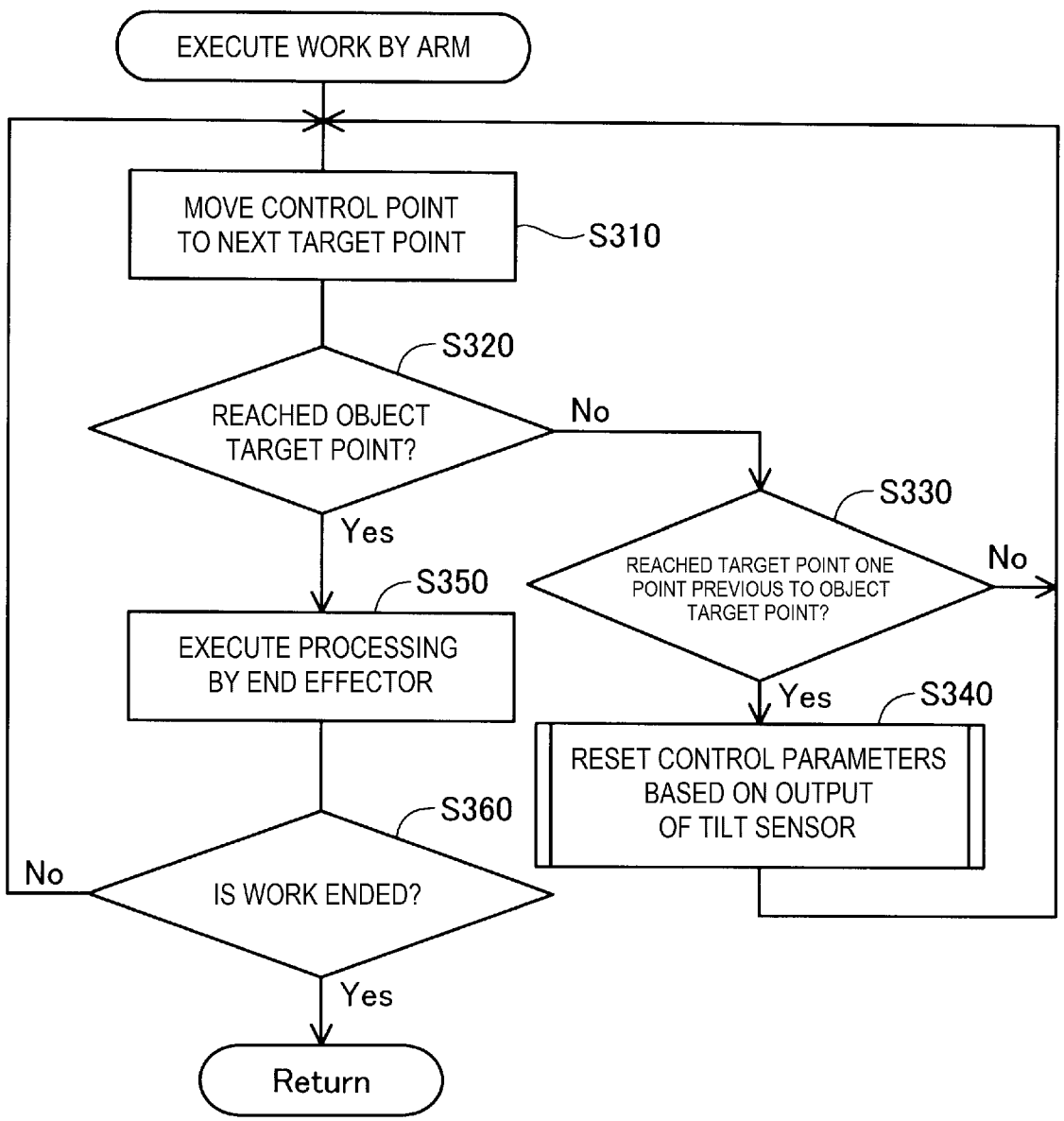
FIG. 5 is a flowchart showing processing when the autonomous mobile robot performs work in the workstation.

FIG. 5 is the flowchart showing the processing when the autonomous mobile robot 1 performs work in the workstation WS. The processing in FIG. 5 is mainly executed under control by the operation control apparatus 300 of the robot 100.

At step S310, the operation control apparatus 300 moves the control point TCP to the next target point. In the processing of FIG. 5, the processing at step S310 is repeatedly executed, and thereby, the control point TCP of the robot arm 110 is sequentially located at the plurality of target points.

At step S320, the operation control apparatus 300 determines whether or not the target point where the control point TCP is located is the target point where the processing using the end effector 200 is to be performed. The target point where the processing using the end effector 200 is to be performed is referred to as "object target point" in the embodiment. For example, the target point OP01 where the end effector 200 grips the workpiece WP on the tray T11 and the target point OP04 where the end effector 200 puts the workpiece WP on the tray T12 are the object target points.

When the target point where the control point TCP is placed is the object target point, the processing moves to step S350. When the target point where the control point TCP is placed is not the object target point, the processing moves to step S330.

At step S350, the operation control apparatus 300 performs processing by the end effector 200. For example, when the control point TCP is at the target point OP04, the end effector 200 releases the workpiece WP and puts the workpiece WP on the tray T12.

At step S360, the operation control apparatus 300 determines whether or not all of the works to be executed in the workstation WS are completed is determined. When not all of the works to be executed in the workstation WS are completed, the processing returns to step S310. When all of the works to be executed in the workstation WS are completed, the processing is ended. Then, the processing moves to step S400 in FIG. 4.

At step S330, the operation control apparatus 300 determines whether or not the target point where the control point TCP is placed is the target point one point previous to the object target point. For example, in the example of FIG. 3, the target point OP03 is the target point one point previous to the object target point. When the target point where the control point TCP is placed is the target point one point previous to the object target point, the processing moves to step S340. When the target point where the control point TCP is placed is not the target point one point previous to the object target point, the processing returns to step S310.

At step S340, the operation control apparatus 300 resets the control parameters of the robot arm 110 based on the output of the IMU 710 as the tilt sensor. That is, when the control point TCP is located at the target point OP03 where the control point TCP is to be located one point previously to the object target point OP04 of the plurality of target points OP01 to OP04, the control parameters for positioning the control point TCP at the object target point OP04 are reset based on the tilt relative to the reference direction. The reset control parameters include the angles of the joints J11 to J16 of the robot arm 110 when the control point TCP is placed at the respective target points. In this case, it is assumed that the autonomous mobile robot 1 rotates and tilts around the point ICC as the rotation center. That is, the Y-axis directions of the base coordinate system BC and the Y-axis directions of the robot coordinate system RC are parallel, however, the X-axis directions of the base coordinate system BC and the X-axis directions of the robot coordinate system RC are not parallel, but intersectional or skew and the Z-axis directions of the base coordinate system BC and the Z-axis directions of the robot coordinate system RC are not parallel, but intersectional or skew.

In this specification, the phrase "when the control point is located at the target point, the control parameters are reset" means that the control parameters are reset during a predetermined time interval containing the moment when the control point is located at the target point.

Figure 6:
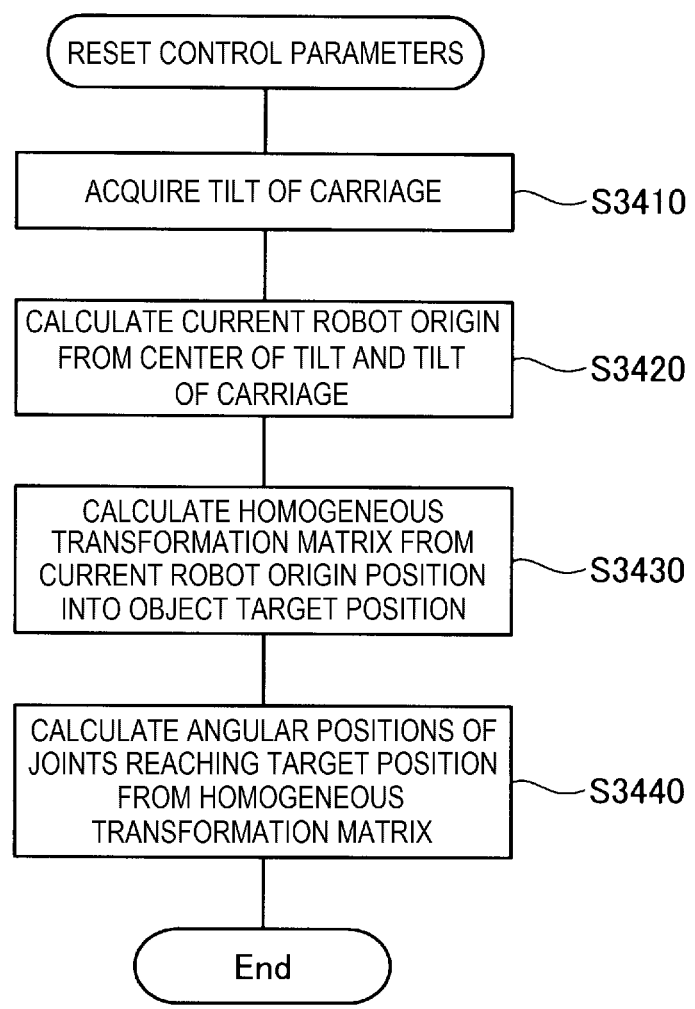
FIG. 6 is a flowchart showing processing when control parameters of a robot arm are reset based on output of an IMU.

FIG. 6 is the flowchart showing the processing when the control parameters of the robot arm 110 are reset based on the output of the IMU 710. The processing in FIG. 6 is mainly executed by the operation control apparatus 300 and the carriage control unit 740.

At step S3410, the carriage control unit 740 recognizes the tilt of the carriage 700 relative to the reference direction based on the information obtained from the IMU 710. The operation control apparatus 300 acquires the information of the tilt of the carriage 700 relative to the reference direction from the carriage control unit 740.

At step S3420, the operation control apparatus 300 calculates a current position B' of the origin Or of the robot coordinate system RC based on the position of the center of the tilt of the carriage 700 and the tilt of the carriage 700. More specifically, the operation control apparatus 300 calculates the current position B' of the origin Or of the robot coordinate system RC based on (i) the relative position between the point ICC as the center of the tilt of the carriage 700 and the origin Or of the robot coordinate system RC located within the base 180 and (ii) the tilt of the carriage 700 relative to the reference direction. In the embodiment, the point ICC as the center of the tilt of the carriage 700 is a contact point between the drive wheel DW and the floor surface. Accordingly, a relative position Vo of the origin Or of the robot coordinate system RC located within the base 180 to the point ICC is known. Note that the relative position of the point ICC as the center of the tilt of the carriage 700 and the origin Or of the robot coordinate system RC located within the base 180 in (i) is an arrow Vo in FIG. 1.

At step S3430, the operation control apparatus 300 calculates a homogeneous transformation matrix $^{B'}T_{tar}$ for coordinate transformation from the current position B' of the origin Or of the robot coordinate system RC into an object target point Tar.

Figure 7:
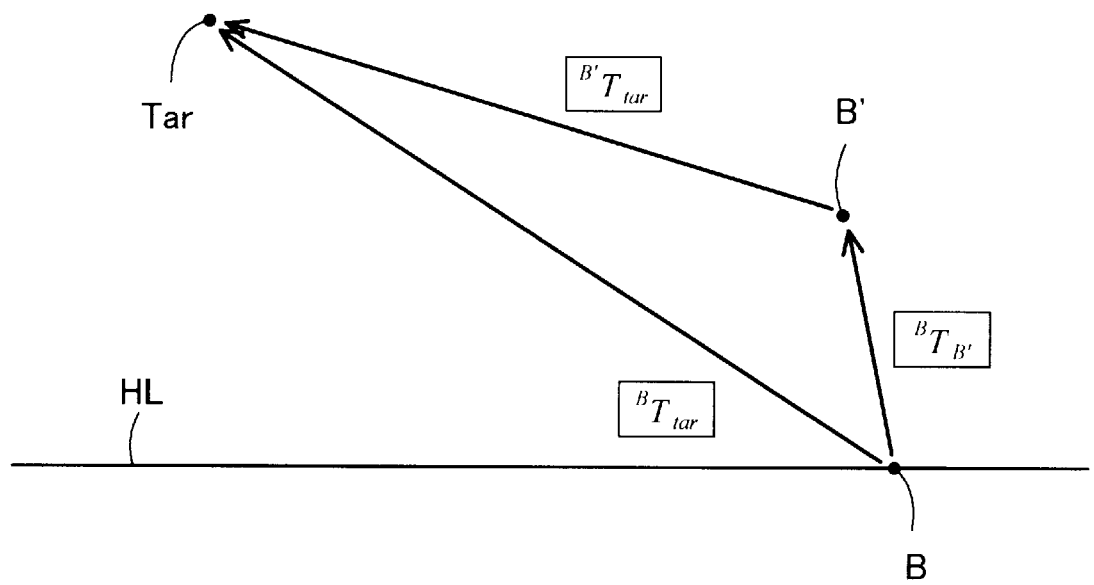
FIG. 7 is an explanatory diagram showing details of processing at step S3430.

FIG. 7 is the explanatory diagram showing the details of the processing at step S3430. In FIG. 7, the position of the origin Or of the robot coordinate system RC when the direction of the carriage 700 coincides with the reference direction is referred to as "B". When the direction of the carriage 700 coincides with the reference direction, a horizontal plane passing through the origin Or is referred to as "horizontal plane HL".

A relative position Vt of the object target point Tar relative to the position B of the origin Or of the robot coordinate system RC when the carriage 700 is placed in the reference direction is obtained in advance in the processing at step S100 in FIG. 4. A homogeneous transformation matrix $^{B}T_{tar}$ for coordinate transformation from the position B of the origin Or of the robot coordinate system RC into the object target point Tar when the carriage 700 is placed in the reference direction is obtained based on the relative position.

A homogeneous transformation matrix $^{B}T_{B'}$ for coordinate transformation from the position B into the position B' is obtained based on the relative position between the position B of the origin Or of the robot coordinate system RC when the carriage 700 is placed in the reference direction and the current position B' of the origin Or of the robot coordinate system RC obtained by the processing at step S3420.

The relationship among (i) the homogeneous transformation matrix $^{B'}T_{tar}$ for coordinate transformation from the current position B' of the origin Or of the robot coordinate system RC into the object target point Tar, (ii) the homogeneous transformation matrix $^{B}T_{tar}$ for coordinate transformation from the position B of the origin Or of the robot coordinate system RC into the object target point Tar when the carriage 700 is placed in the reference direction, and (iii) the homogeneous transformation matrix $^{B}T_{B'}$ for coordinate transformation from the position B into the position B' is expressed by the following expression (1).

$$^{B}T_{tar} = {}^{B}T_{B'} {}^{B'}T_{tar} \quad (1)$$

From the expression (1), $^{B'}T_{tar}$ is obtained by the following expression (2).

$$^{B'}T_{tar} = ({}^{B}T_{B'})^{-1} {}^{B}T_{tar} \quad (2)$$

At step S3440 in FIG. 6, the operation control apparatus 300 calculates the angles of the joints J11 to J16 of the robot arm 110 for placement of the control point TCP at the object target point Tar with reference to the current origin Or of the robot coordinate system RC based on the homogeneous transformation matrix $^{B'}T_{tar}$ obtained at step S3430.

Through the above described processing, resetting of the angles of the joints J11 to J16 of the robot arm 110 at step S340 in FIG. 5 is executed.

When the processing at step S310 is performed after step S340 in FIG. 5, at step S310, processing of positioning the control point TCP at the object target point OP04 is performed using the reset control parameters.

Through the above described processing, even when the direction of the carriage 700 tilts relative to the assumed direction, the control point TCP of the robot arm 110 may be accurately located at the proper object target point OP04.

The autonomous mobile robot 1 in the embodiment is also referred to as "robot system". The carriage 700 is also referred to as "vehicle". The IMU 710 is also referred to as "tilt sensor".

B. Second Embodiment

The second embodiment is different from the first embodiment in a part of the processing when the autonomous mobile robot 1 performs work in the workstation WS. More specifically, predetermined processing is excused after step S340 in FIG. 5, and then, the processing at step S310 is executed. The rest of the second embodiment is the same as that of the first embodiment.

Figure 8:
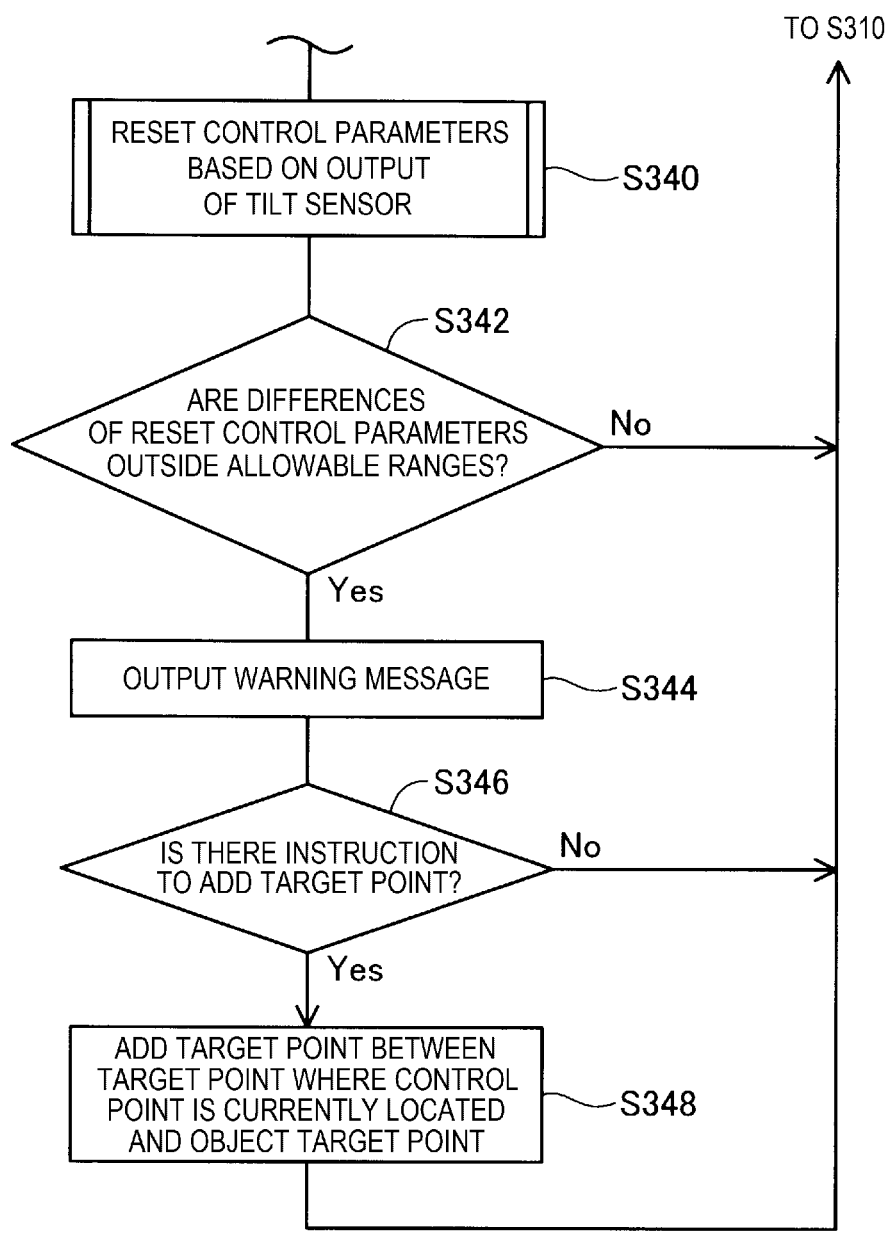
FIG. 8 is a flowchart of a second embodiment showing processing when the autonomous mobile robot performs work in the workstation.

FIG. 8 is the flowchart of the second embodiment showing the processing when the autonomous mobile robot 1 performs work in the workstation WS. In the second embodiment, the processing when the autonomous mobile robot 1 performs work is the same as the processing in the first embodiment except processing at steps S342 to S348 shown in FIG. 8.

At step S342, the operation control apparatus 300 determines whether or not differences between the control parameters reset at step S340 and the control parameters before resetting are outside predetermined ranges. "Predetermined ranges" are determined with respect to each control parameter. Note that "predetermined ranges" may be determined for calculation values obtained from the plurality of control parameters.

When the differences between the reset control parameters and the control parameters before resetting are within the predetermined ranges, the processing returns to step S310. When the differences between the reset control parameters and the control parameters before resetting are outside the predetermined ranges, the processing moves to step S344.

At step S344, the operation control apparatus 300 transmits a notification that a warning message is to be issued to the higher-level management apparatus 600. The higher-level management apparatus 600 issues a warning to the user via the output device 608. More specifically, a possibility that the control point of the robot arm is not accurately located at the proper object target point is higher due to the tilt of the carriage 700 in the current work in the workstation WS is notified. Further, the higher-level management apparatus 600 outputs a message to prompt addition of a target point via the output device 608.

When the changes of the control parameters by resetting of the control parameters are outside the predetermined ranges, a possibility that the following situations occur is higher than that when not. That is, the posture of the robot arm 110 largely changes from the initially assumed position due to resetting of the control parameters, and thereby, in the middle of the movement of the control point TCP, the tilt of the carriage 700 may largely change. Accordingly, the possibility that the control point TCP of the robot arm 110 is not accurately located at the proper object target point is higher. The processing at steps 342, 344 is performed, and thereby, the user may know the possibility that the control point TCP of the robot arm 110 is not accurately located at the proper object target point in advance. As a result, as will be described later, the user may perform processing of avoiding the situation where the control point TCP is not accurately located at the proper object target point.

The user receives the message to prompt addition of a target point via the output device 608. When a determination that a target point is to be added is made, the user performs input as to a target point is to be added via the input device 607 of the higher-level management apparatus 600. When a determination that a target point is not added is made, the user performs input as to a target point is not added via the input device 607 of the higher-level management apparatus 600.

At step S346, the higher-level management apparatus 600 determines whether or not the input as to a target point is to be added is performed via the input device 607 of the higher-level management apparatus 600. When the input as to a target point is not added is performed, the processing returns to step S310. When the input as to a target point is to be added is performed, the processing moves to step S348.

At step S348, the higher-level management apparatus 600 adds a target point between the target point where the control point TCP is to be located one point previously to the object target point and the object target point. The additional target point is added to the midpoint between the target point where the control point TCP is to be located one point previously to the object target point and the object target point. In the example of FIG. 3, a target point OP05 is added between the target point OP03 where the control point TCP is to be located one point previously to the object target point OP04 and the object target point OP04. Then, the processing returns to step S310.

Through the processing, the control parameters are reset at the target point OP05 closer to the object target point OP04 than the target point OP03 where the control point TCP is to be located one point previously to the object target point OP04. This will be explained at step S340 in FIG. 5. Accordingly, in this case, a possibility that the differences between the control parameters reset at step S340 and the control parameters before resetting are within the predetermined ranges is higher. Therefore, a possibility that the control point TCP of the robot arm 110 may be accurately located at the proper object target point OP04 is higher.

C. Third Embodiment

The third embodiment is different from the first embodiment in a part of the processing when the autonomous mobile robot 1 performs work in the workstation WS. More specifically, when the determination result at step S330 in FIG. 5 is Yes, predetermined processing is excused, and then, processing at step S340 is executed. The rest of the third embodiment is the same as that of the first embodiment.

Figure 9:
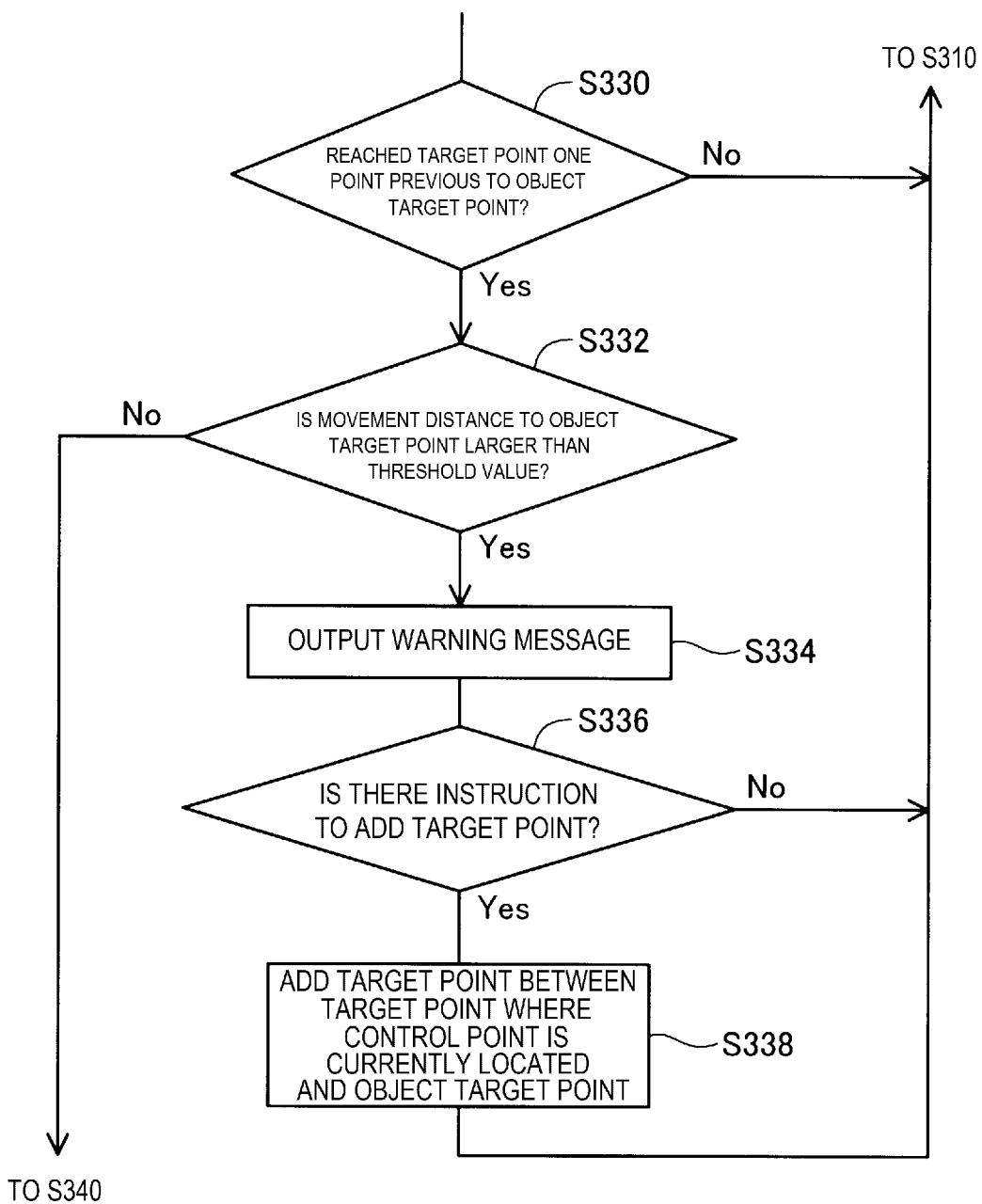
FIG. 9 is a flowchart of a third embodiment showing processing when the autonomous mobile robot performs work in the workstation.

FIG. 9 is the flowchart of the third embodiment showing the processing when the autonomous mobile robot 1 performs work in the workstation WS. In the third embodiment, the processing when the autonomous mobile robot 1 performs work is the same as the processing in the first embodiment except processing at steps S332 to S338 shown in FIG. 9.

At step S332, the operation control apparatus 300 determines whether or not a distance between the target point where the control point TCP is to be located one point previously to the object target point and the object target point is larger than a predetermined threshold value. In the example of FIG. 3, whether or not a distance Lob between the target point OP03 and the object target point OP04 is larger than the threshold value is determined.

When the distance between the target point where the control point TCP is to be located one point previously to the object target point and the object target point is not larger than the predetermined threshold value, the processing moves to step S340. When the distance between the target point where the control point TCP is to be located one point previously to the object target point and the object target point is larger than the predetermined threshold value, the processing moves to step S334.

At step S334, the operation control apparatus 300 transmits a notification that a warning message is to be issued to the higher-level management apparatus 600. The higher-level management apparatus 600 issues a warning to the user via the output device 608. More specifically, a possibility that the control point of the robot arm is not accurately located at the proper object target point is higher due to the longer movement distance when the end effector 200 is moved to the target point where the processing is to be performed by the end effector 200 and the tilt of the carriage 700 is notified. Further, the higher-level management apparatus 600 outputs a message to prompt addition of a target point via the output device 608.

The user receives the message to prompt addition of a target point via the output device 608. When a determination that a target point is to be added is made, the user performs input as to a target point is to be added via the input device 607 of the higher-level management apparatus 600. When a determination that a target point is not added is made, the user performs input as to a target point is not added via the input device 607 of the higher-level management apparatus 600.

The processing at steps S336, S338 is the same as the processing at steps S346, S348 of the second embodiment.

When the distance between the target point where the control point is to be located one point previously to the object target point and the object target point is larger than the threshold value, a possibility that the tilt of the vehicle changes due to a change of the position of the center of gravity in the middle of the movement of the control point TCP toward the object target point is higher than that when not. Accordingly, the possibility that the control point TCP of the robot arm 110 is not accurately located at the proper object target point is higher. The processing at steps 322, 324 is performed, and thereby, the user of the robot system may know the possibility that the control point TCP of the robot arm 110 is not accurately located at the proper object target point OP04 in advance. As a result, the user may perform processing of avoiding the situation where the control point TCP is not accurately located at the proper object target point.

Figure 10:
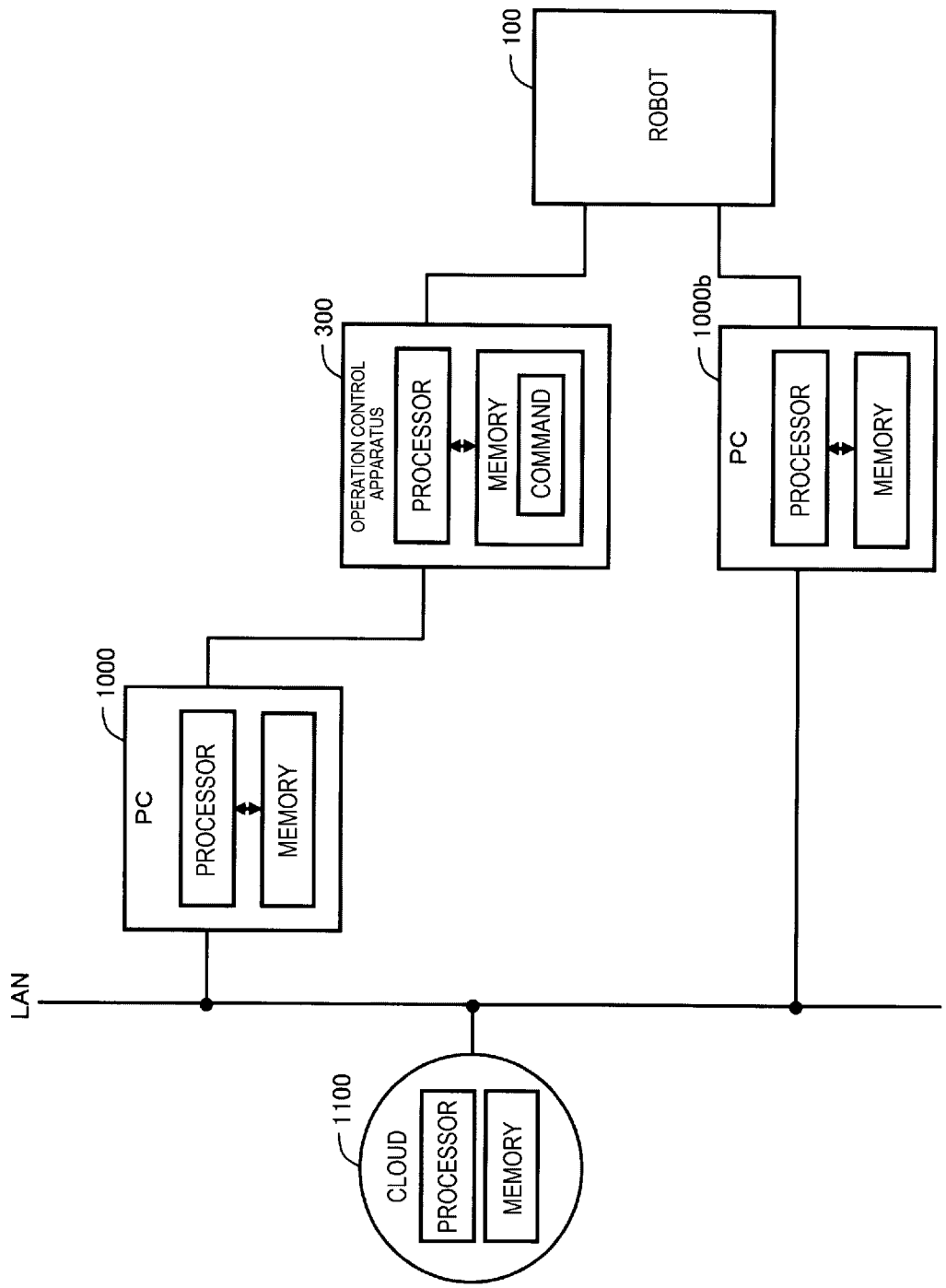
FIG. 10 is a conceptual diagram showing an example in which a control apparatus of a robot is formed by a plurality of processors.

D. Fourth Embodiment (1) FIG. 10 is the conceptual diagram showing the example in which the control apparatus of the robot is formed by the plurality of processors. In this example, in addition to the robot 100 and the operation control apparatus 300 thereof, personal computers 1000, 1000b and a cloud service 1100 provided via a network environment such as a LAN are described. Each of the personal computers 1000, 1000b includes a processor and a memory. Further, a processor and a memory are available in the cloud service 1100. The processors execute computer-executable commands. Part or all of these plurality of processors are used, and thereby, part or all of the operation control apparatus 300 and the higher-level management apparatus 600 can be realized. Further, memory units that store various kinds of information can be realized using part or all of these plurality of memories.

Figure 11:
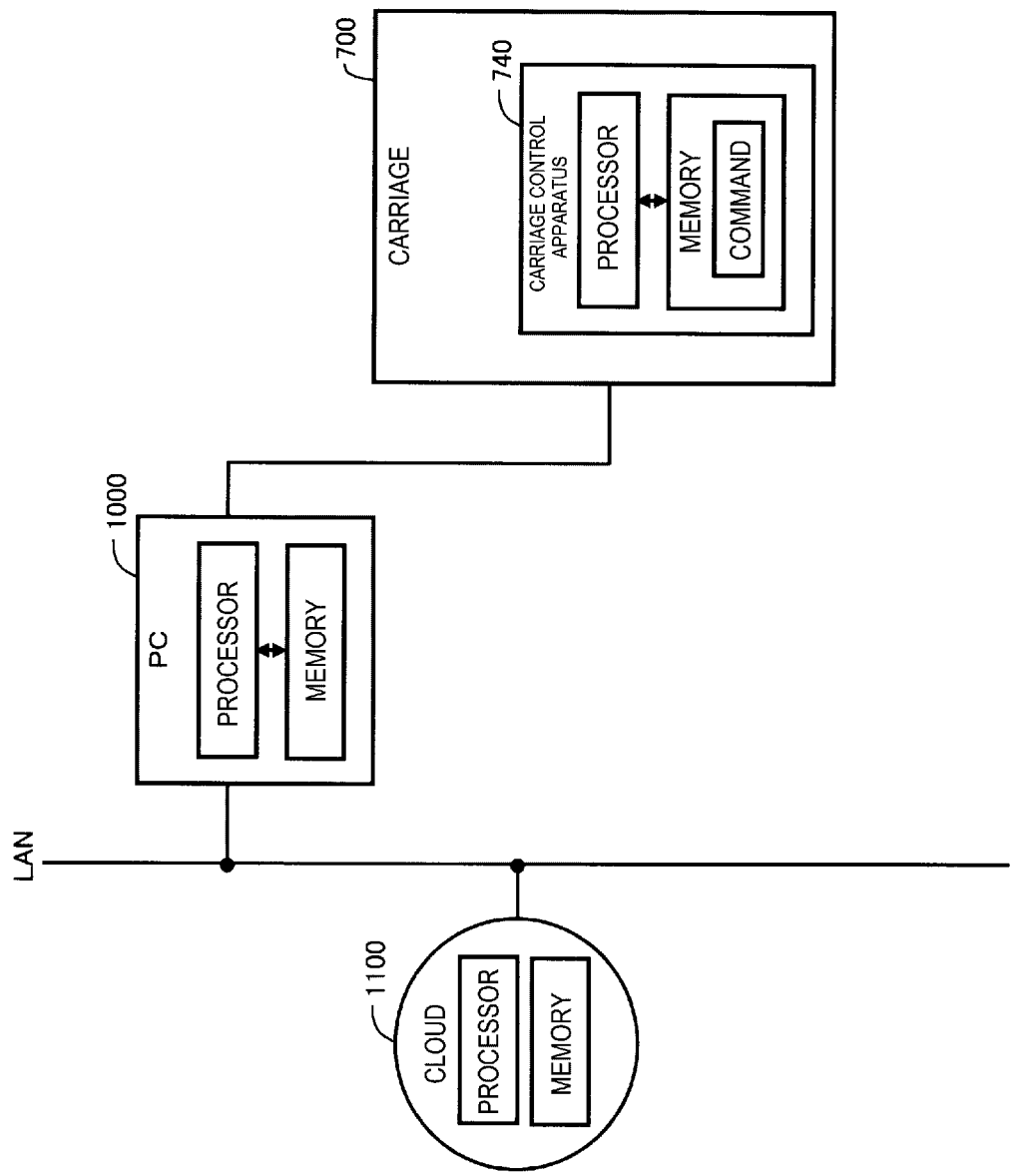
FIG. 11 is a conceptual diagram showing an example in which a control apparatus of a carriage is formed by a plurality of processors.

(2) FIG. 11 is the conceptual diagram showing the example in which the control apparatus of the carriage is formed by the plurality of processors. In this example, in addition to the carriage 700 and the carriage control unit 740 thereof, personal computers 1000, 1000*b* and a cloud service 1100 provided via a network environment such as a LAN are described. Each of the personal computers 1000, 1000*b* includes a processor and a memory. Further, a processor and a memory are available in the cloud service 1100. The processors execute computer-executable commands. Part or all of these plurality of processors are used, and thereby, part or all of the carriage control unit 740 and the higher-level management apparatus 600 can be realized. Further, memory units that store various kinds of information can be realized using part or all of these plurality of memories.

Figure 12:
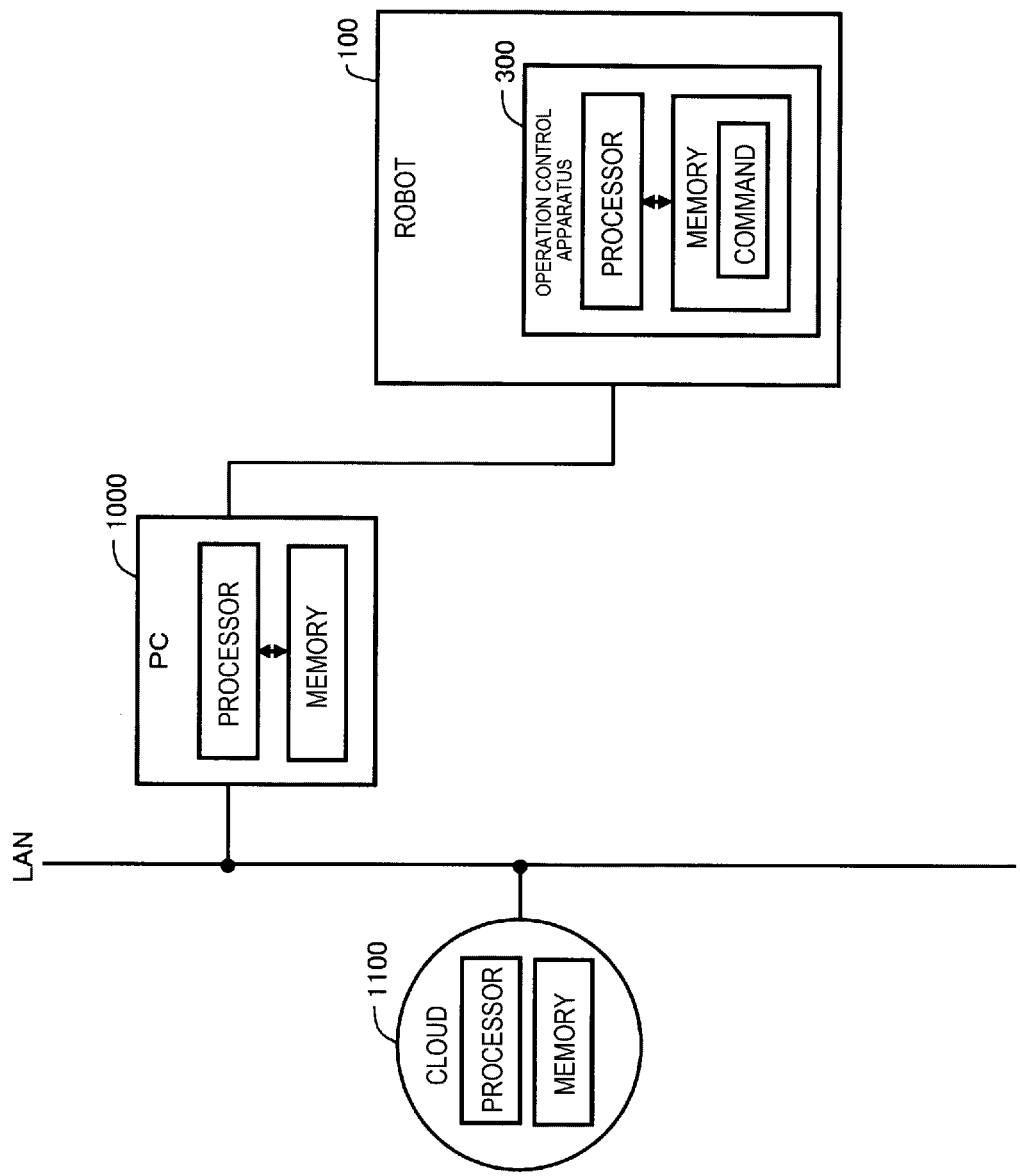
FIG. 12 is a conceptual diagram showing another example in which the control apparatus of the robot is formed by a plurality of processors.

(3) FIG. 12 is the conceptual diagram showing the other example in which the control apparatus of the robot is formed by the plurality of processors. This example is different from that in FIG. 10 in that the operation control apparatus 300 of the robot 100 is stored in the robot 100. Also, in this example, part or all of these plurality of processors are used, and thereby, part or all of functions of the operation control apparatus 300 and the higher-level management apparatus 600 can be realized. Further, memory units that store various kinds of information can be realized using part or all of these plurality of memories.

Figure 13:
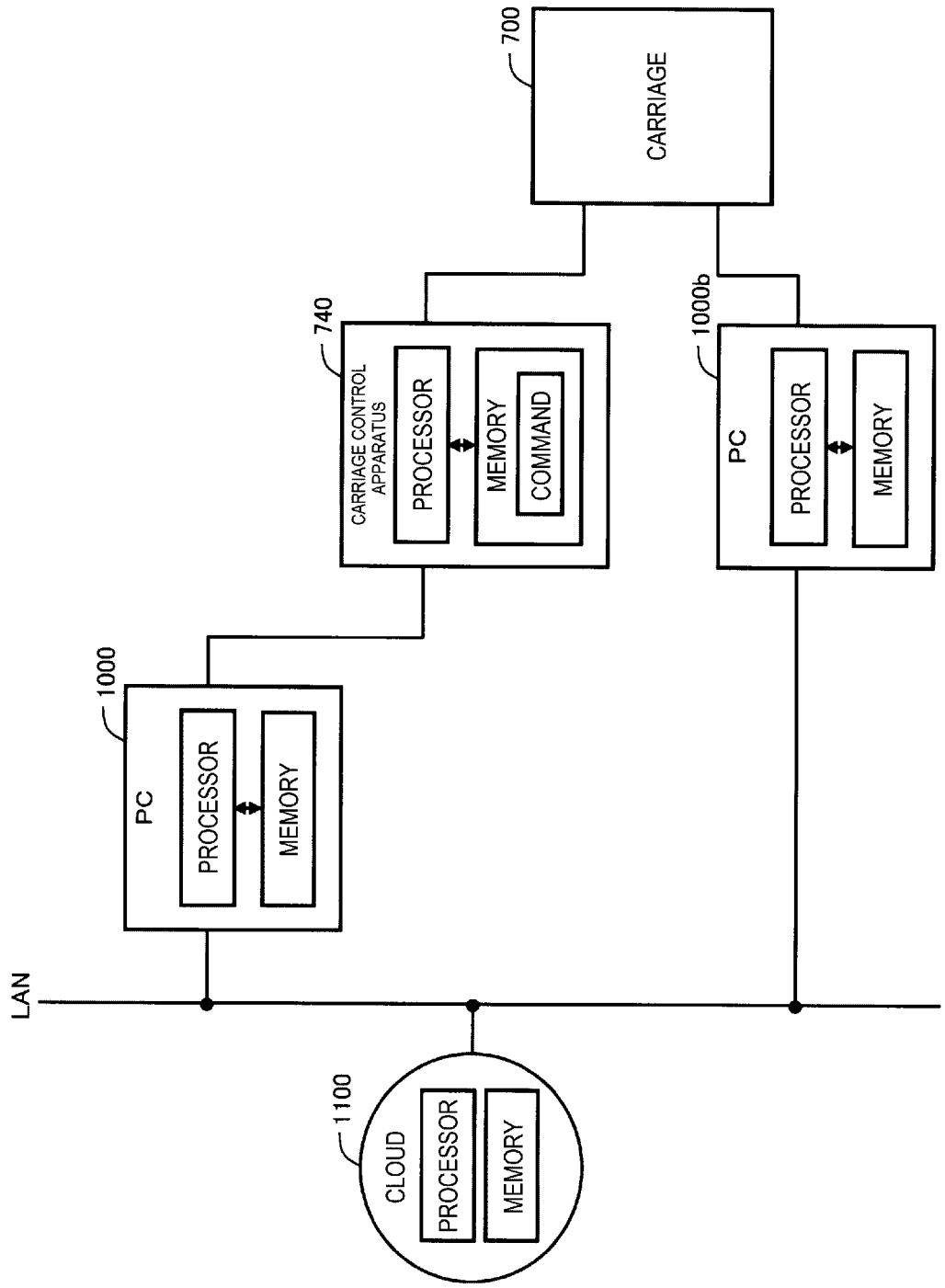
FIG. 13 is a conceptual diagram showing another example in which the control apparatus of the carriage is formed by a plurality of processors.

(4) FIG. 13 is the conceptual diagram showing the other example in which the control apparatus of the carriage is formed by the plurality of processors. This example is different from that in FIG. 11 in that the carriage control unit 740 is placed outside of the carriage 700. Also, in this example, part or all of these plurality of processors are used, and thereby, part or all of the carriage control unit 740 and the higher-level management apparatus 600 can be realized. Further, memory units that store various kinds of information can be realized using part or all of these plurality of memories.

E. Other Embodiments

E1. Other Embodiment 1

(1) In the above described embodiments, the reference direction of the carriage 700 is the direction in which the directions of the X-axis, the Y-axis, and the Z-axis of the robot coordinate system RC are parallel to the directions of the X-axis, the Y-axis, and the Z-axis of the base coordinate system BC, respectively. The base coordinate system BC is determined with respect to each workstation WS. However, the reference directions of the robot arm and the vehicle may be determined by another method based on e.g. absolute coordinates.

(2) In the above described embodiments, the carriage 700 tilts around the point ICC where the pair of drive wheels DW are in contact with the floor surface. However, the vehicle may tilt around various points as the center of tilt e.g. a vehicle moving with legs. The above described respective embodiments may be applied to a robot system including a vehicle for which the center of tilt may be specified in advance or a robot system including a vehicle for which the center of tilt may be estimated.

(3) In the above described embodiments, the technique of the present disclosure is explained with the example of the robot 100 as the vertical articulated robot including the single robot arm 110. However, the technique of the present disclosure may be applied to a scalar robot. Further, the technique of the present disclosure may be applied to a robot having a plurality of arms e.g. a robot having two arms.

(4) In the above described embodiments, the object target point is the target point where the processing by the end effector 200 is to be performed. This is explained at OP04 in FIG. 3. However, the object target point is not limited to that. For example, the object target point may be a target point where a workpiece held by the end effector or the end effector itself is to be in contact with another member or a target point where processing of moving a workpiece held by the end effector or the end effector itself in contact with another member is to be performed. That is, the object target point may be an arbitrary target point where the control point of the robot is to be accurately placed.

(5) In the above described embodiments, at step S3410 in FIG. 6, the carriage control unit 740 recognizes the tilt of the carriage 700 relative to the reference direction based on the information obtained from the IMU 710, and the operation control apparatus 300 acquires information of the tilt from the carriage control unit 740. However, the tilt of the carriage 700 may be detected based on the force detection unit 190. That is, the tilt of the carriage 700 or the robot 100 may be obtained from a relationship between (i) the direction of the force to be detected by the force detection unit 190 when the autonomous mobile robot 1 is placed in the reference direction, the autonomous mobile robot 1 is in the stationary condition, and the control point is located at the target point and (ii) the direction of the force actually detected by the force detection unit 190, which is detected by the force detection unit 190 when the autonomous mobile robot 1 is in the stationary condition and the control point is located at the above described certain target point. Here, the force detection unit 190 corresponds to the tilt sensor. Or, the tilt of the carriage 700 or the robot 100 may be obtained based on a gyro sensor provided in the robot 100 or the carriage 700. Here, the gyro sensor corresponds to the tilt sensor. The processing may be performed by the operation control apparatus 300 of the robot 100 or the carriage control unit 740 of the carriage 700.

(6) In the above described embodiments, the IMU 710 is provided in the carriage 700 and the force detection unit 190 is provided in the lower part of the base 180. The tilt sensor that may detect the tilt of at least one of these robot arm and vehicle may be fixed to the base part of the robot arm or fixed to the vehicle. Or, on the assumption that the robot arm is set in a predetermined posture, the force detection unit provided in a part at the distal end of the robot arm or in the middle of the robot arm may be used as the tilt sensor.

Or, the tilt sensor that may detect the tilt of at least one of the robot arm and the vehicle may be a sensor such as a camera or ultrasonic sensor provided in another structure than the autonomous mobile robot 1 as the robot system.

The control unit may detect the tilt of at least one of the robot arm and the vehicle based on one or more of those sensors.

(7) In the above described embodiments, the control parameters reset at step S340 in FIG. 5 are explained with the examples of the angular positions of the respective joints. However, the control parameter reset based on the tilt from the reference direction may be another control parameter such as a direction and magnitude of a force to be applied to another member via the end effector.

(8) At above described step S344 of the second embodiment and step S334 of the third embodiment, the higher-level management apparatus 600 issues the warning to the user via the output device 608. However, the warning may be executed by another method. For example, the autonomous mobile robot 1 may include an output device such as a lamp, speaker, or display and the warning may be output from those output devices.

E2. Other Embodiment 2

In the above described first embodiment, when the target point where the control point TCP is placed is the target point one point previous to the object target point, the operation control apparatus 300 resets the control parameters of the robot arm 110 based on the output of the IMU 710 as the tilt sensor. This is explained at steps S330, S340 in FIG. 5. However, further, even when the target point where the control point TCP is placed is the target point two or more points previous to the object target point, a configuration in which the operation control apparatus 300 resets the control parameters of the robot arm 110 based on the output of the IMU 710 as the tilt sensor may be employed. In the configuration, in the example of FIG. 3, when the control point TCP is located at the target point OP02 or the target point OP01 where the control point TCP is to be located two or more points previously to the object target point OP04 of the plurality of target points OP01 to OP04, the control parameters for positioning the control point TCP at the object target point OP04 are reset based on the tilt from the reference direction.

In the configuration, compared to a configuration in which resetting is not performed when the control point TCP is located at the target point where the control point TCP is to be located two or more points previously, the following effects may be obtained. That is, differences between the control parameters reset at the target point OP03 one point previous to the object target point OP04 and the control parameters reset previously, i.e., at the target point OP02 may be reduced. Accordingly, by resetting of the control parameters at the previous target point OP03, the posture of the robot arm 110 does not largely differ from the posture assumed before the resetting. As a result, a difference between the tilt used for resetting of the control parameters at the target point OP03 one point previous to the object target point OP04 and the tilt after the robot arm 110 is controlled by the reset control parameters is smaller. Therefore, the control point TCP of the robot arm 110 may be accurately located at the proper object target point OP04 using the control parameters reset at the target point OP03 one point previous to the object target point OP04.

(2) At the three or more target points where the control point is located before the object target point, the resetting of the control parameters may be performed.

E3. Other Embodiment 3

In the above described second embodiment, at step S344 in FIG. 8, the warning that the possibility that the control point of the robot arm is not accurately located at the proper object target point is higher is issued. However, a configuration in which whether or not the differences between the reset control parameters and the control parameters before resetting are outside the predetermined ranges is not determined and the processing at step S344 is not performed may be employed.

E4. Other Embodiment 4

In the above described second embodiment, when the differences between the reset control parameters and the control parameters before resetting are outside the predetermined ranges and the input as to a target point is to be added is performed, a target point is added. This is explained at steps S342, S346, S348 in FIG. 8. However, the condition for addition of a target point may be another condition. For example, a configuration in which, when the differences between the reset control parameters and the control parameters before resetting are outside the predetermined ranges, whether or not a target point is added may be set in advance may be employed. In the configuration, when the addition of a target point is set, the target point may be added after the confirmation by the user or without the confirmation.

Another configuration required for addition of a target point than the condition that the differences between the reset control parameters and the control parameters before resetting are outside the predetermined ranges may be such a condition substantially constantly satisfied that "work is not interrupted based on an instruction by the user or output from a predetermined sensor".

(2) In the above described second embodiment, at step S344, the warning that the possibility that the control point of the robot arm is not accurately located at the proper object target point is higher is issued. Further, the message to prompt the addition of a target point is output.

However, a configuration in which, when the differences between the reset control parameters and the control parameters before resetting are outside the predetermined ranges, only the warning is output, but the message to prompt the addition of a target point is not output may be employed. Or, a configuration in which, when the differences between the reset control parameters and the control parameters before resetting are outside the predetermined ranges, the warning is not output, but only the message to prompt the addition of a target point is output may be employed. The same applies to the output at step S334 of the third embodiment.

(3) In the above described second embodiment, at step S348 in FIG. 8, a target point is added to the midpoint between the target point where the control point TCP is to be located one point previously to the object target point and the object target point. However, the additional target point may be added to another position such as a point where the part between the target point where the control point TCP is to be located one point previously to the object target point and the object target point is internally divided at 2:1 or a point where the part is internally divided at 4:1. Further, a point not on a line segment with both ends at the target point where the control point TCP is to be located one point previously to the object target point and the object target point may be determined as the additional target point. The same applies to the addition of a target point at step S338 of the third embodiment (see FIG. 9).

E5. Other Embodiment 5

In the above described second embodiment, at step S334 in FIG. 9, the warning that the possibility that the control point of the robot arm is not accurately located at the proper object target point is higher is issued (see FIG. 8). However, a configuration in which whether or not the distance between the target point where the control point TCP is to be located one point previously to the object target point and the object target point is larger than the predetermined threshold value is not determined and the processing at step S334 is not performed may be employed.

E6. Other Embodiment 6

(1) In the above described third embodiment, the distance between the target point where the control point TCP is to be located one point previously to the object target point and the object target point is larger than the predetermined threshold value and the input as to a target point is to be added is performed, a target point is added (see S332, S336, S338 in FIG. 8). However, the condition for addition of a target point may be another condition. For example, a configuration in which, when the distance between the target point where the control point TCP is to be located one point previously to the object target point and the object target point is larger than the predetermined threshold value, whether or not addition of a target point may be set in advance may be employed. In the configuration, when the addition of a target point is set, the target point may be added after the confirmation by the user or without the confirmation.

Another condition required for addition of a target point than the condition that the distance between the target point where the control point TCP is to be located one point previously to the object target point and the object target point is larger than the predetermined threshold value may be such a condition substantially constantly satisfied that "work is not interrupted based on an instruction by the user or output from a predetermined sensor".

(2) The processing corresponding to step S332 to S338 in FIG. 9 may be executed when the control parameters are set in advance at step S100 in FIG. 4.

(3) In the above described third embodiment, the processing at steps S342 to S348 in FIG. 8 is not performed. However, a configuration in which both the processing at step S332 to S338 in FIG. 9 and the processing at steps S342 to S348 in FIG. 8 are performed may be employed.

F. Still Other Embodiments

The present disclosure is not limited to the above described embodiments, but may be realized in various configurations without departing from the scope thereof. For example, the present disclosure can be realized in the following configurations. The technical features in the above described embodiments corresponding to technical features in the following respective configurations can be appropriately replaced or combined for solving part or all of the problems of the present disclosure or achieving part or all of the effects of the present disclosure. Further, the technical features not described as essential features in this specification can be appropriately deleted.

(1) According to an aspect of the present disclosure, a control method for a robot system is provided. The robot system includes a robot arm, a vehicle being movable and supporting the robot arm, and a tilt sensor configured to detect a tilt relative to a reference direction of at least one of the robot arm and the vehicle. The control method includes a step of controlling the robot arm to sequentially position a control point of the robot arm to a plurality of target points. The step of controlling the robot arm includes, when the control point is located at the target point where the control point is to be located one point previously to an object target point of the plurality of target points, resetting a control parameter for positioning the control point at the object target point based on the tilt from the reference direction, and positioning the control point at the object target point using the reset control parameter.

In the configuration, even when the direction of the vehicle tilts relative to the assumed direction, the control point of the robot arm may be accurately located at the proper object target point.

(2) In the control method of the above described aspect, the step of controlling the robot arm may include, when the control point is located at the target point where the control point is to be located two or more points previously to the object target point of the plurality of target points, resetting the control parameter for positioning the control point at the object target point based on the tilt from the reference direction.

In the configuration, compared to a configuration in which resetting is not performed when the control point is located at the target point where the control point is to be located two or more points previously, the following effects may be obtained. That is, the difference between the control parameter reset at the target point one point previous to the object target point and the control parameter reset previously may be reduced. Accordingly, by resetting of the control parameter, the posture of the robot arm does not largely differ from the posture assumed before the resetting at the target point one point previous. As a result, a difference between the tilt used for resetting of the control parameter at the target point one point previous to the object target point and the tilt after the robot arm is controlled by the reset control parameter is smaller. Therefore, the control point of the robot arm may be accurately located at the proper object target point using the control parameter reset at the target point one point previous to the object target point.

(3) In the control method of the above described aspect, the step of controlling the robot arm may include, when a difference between the control parameter reset at the target point where the control point is to be located one point previously to the object target point and the control parameter before resetting at the target point where the control point is to be located one point previously to the object target point is outside a predetermined range, issuing a warning.

When a change of the control parameter by resetting of the control parameter is outside the predetermined range, a possibility that the following situations occur is higher than that when not. That is, the posture of the robot arm largely changes due to resetting of the control parameter, and thereby, in the middle of the movement of the control point, the tilt of the vehicle may largely change. Accordingly, the possibility that the control point of the robot arm is not accurately located at the proper object target point is higher. In the above described configuration, the user of the robot system may know the possibility that the control point of the robot arm is not accurately located at the proper object target point in advance.

(4) In the control method of the above described aspect, the step of controlling the robot arm may include, when a predetermined condition including a condition that a difference between the control parameter reset at the target point where the control point is to be located one point previously to the object target point and the control parameter before resetting at the target point where the control point is to be located one point previously to the object target point is outside the predetermined range is satisfied, adding a target point between the target point where the control point is to be located one point previously to the object target point and the object target point.

When the difference of the position where the control point is placed by resetting of the control parameter is outside the predetermined range, a possibility that the tilt of the vehicle changes in the middle of the movement of the control point is higher than that when not. Accordingly, the possibility that the control point of the robot arm is not accurately located at the proper object target point is higher. However, in the above described configuration, even in the case, the possibility that the control point of the robot arm may be accurately positioned at the proper object target point is higher.

(5) In the control method of the above described aspect, the step of controlling the robot arm may include, when a distance between the target point where the control point is to be located one point previously to the object target point and the object target point is larger than a threshold value, issuing a warning.

When the distance between the target point where the control point is to be located one point previously to the object target point and the object target point is larger than the threshold value, the possibility that the tilt of the vehicle changes in the middle of the movement of the control point toward the object target point is higher than that when not. Accordingly, the possibility that the control point of the robot arm is not accurately located at the proper object target point is higher. However, in the above described configuration, the user of the robot system may know the possibility that the control point of the robot arm is not accurately located at the proper object target point in advance.

(6) In the control method of the above described aspect, the step of controlling the robot arm may include, when a predetermined condition including a condition that a distance between the target point where the control point is to be located one point previously to the object target point and the object target point is larger than a threshold value is satisfied, adding a target point between the target point where the control point is to be located one point previously to the object target point and the object target point.

When the distance between the target point where the control point is to be located one point previously to the object target point and the object target point is larger than the threshold value, the possibility that the tilt of the vehicle changes in the middle of the movement of the control point toward the object target point is higher than that when not. Accordingly, the possibility that the control point of the robot arm is not accurately located at the proper object target point is higher. However, in the above described configuration, even in the case, the possibility that the control point of the robot arm may be accurately positioned at the proper object target point is higher.

The present disclosure can be realized in various other aspects than the control method for the robot system. For example, the present disclosure may be realized in aspects of a robot system, a computer program for realizing a control method for the robot system, a non-transitory recording medium in which the computer program is recorded, etc.

Not all of the plurality of component elements of the respective configurations of the above described present disclosure are essential. To solve part or all of the above described problems or achieve part or all of the effects described in the specification, regarding partial component elements of the plurality of component elements, appropriate changes, deletion, replacement by new other component elements, or partial deletion of limitations can be made.

Further, to solve part or all of the above described problems or achieve part or all of the effects described in the specification, part or all of the technical features contained in one configuration of the above described present disclosure may be combined with part or all of the technical features contained in the other configuration of the above described present disclosure to form one independent configuration of the present disclosure.

What is claimed is:

1. A control method for a robot system for causing a processor to execute a process,
    the robot system including:
       a robot arm,
       a vehicle being movable and supporting the robot arm, and
       a tilt sensor configured to detect a tilt value of a tilt relative to a reference direction of t least one of the robot arm or the vehicle,
    the control method comprising executing on the processor the steps of:
       controlling the robot arm to sequentially position a control point of the robot arm to a plurality of target points initially based on a control parameter, the plurality of target points including an initial target point a previous target point, and an object target point the previous target point being initially set as one point directly prior to the object target point among the plurality of target points;
       moving at least one of the robot arm or the vehicle to position the control point to the initial target point using the control parameter;
       moving at least one of the robot arm or the vehicle to position the control point to the previous target point using the control parameter after the control point is positioned at the initial target point;
       causing the tilt sensor to detect the tilt value of the tilt relative to the reference direction of at least one of the robot arm or the vehicle when the control point is positioned at the previous target point;
       resetting the control parameter based on the tilt value so as to generate a reset control parameter; and
       moving at least one of the robot arm or the vehicle to position the control point to the object target point using the reset control parameter.

2. The control method according to claim 1, the control method further comprising executing on the processor the steps of:
    moving at least one of the robot arm or the vehicle to position the control point to another previous target point, as one of the plural of target points, that is located prior to the previous target point using the control parameter after the control point is positioned at the initial target point and before the control point is positioned at the previous target point;
    causing the tilt sensor to detect the tilt value of the tilt relative to the reference direction of at least one of the robot arm or the vehicle when the control point is positioned at the another previous target point; and
    resetting the control parameter based on the tilt value so as to generate the reset control parameter.

3. The control method according to claim 1, wherein when a difference between the control parameter and the reset control parameter is outside a predetermined range, the processor is further configured to issue a warning.

4. The control method according to claim 1, wherein
when a difference between the control parameter and the reset control parameter satisfies a predetermined condition including a state in which the difference is outside a predetermined range, the processor is further configured to add an additional target point, as one of the plurality of target points, between the object target point and the previous target point.

5. The control method according to claim 1, wherein
when a distance between the previous target point and the object target point is larger than a threshold value, the processor is further configured to issue a warning.

6. The control method according to claim 1, wherein
when a distance between the previous target point and the object target point satisfies a predetermined condition including a state in which the distance is larger than a threshold value the processor is further configured to add an additional target point, as one of the plurality of target points, between the object target point and the previous target point.

7. The control method according to claim 1, wherein
the processor is further configured to:
  detect a distance between the previous target point and the object target point;
  determine whether the detected distance is more than a threshold value;
  add another target point between the previous target point and the object target point when the processor determines that the detected distance is more than the threshold value, wherein at least one of the robot arm or the vehicle is moved to position the control point to the another target point using the reset control parameter after the control point is positioned at the previous target point; and
  move at least one of the robot arm or the vehicle to position the control point to the object target point using the reset control parameter after the control point is positioned at the another target point.

* * * * *